US006160048A

United States Patent [19]

Uyeda et al.

[11] Patent Number: 6,160,048

[45] Date of Patent: Dec. 12, 2000

[54] MODIFIED ETHYLENE RESIN HAVING IMPROVED WETTABILITY

[75] Inventors: Tadashi Uyeda; Keiko Matsuhisa; Kenjiro Takayanagi; Mitsutoshi Aritomi, all of Yokkaichi, Japan

[73] Assignee: Mitsubishi Chemical Corporation, Tokyo-To, Japan

[21] Appl. No.: 09/133,963

[22] Filed: Aug. 14, 1998

[30] Foreign Application Priority Data

| | | | |
|---|---|---|---|
| Oct. 3, 1997 | [JP] | Japan | 9-270866 |
| Oct. 3, 1997 | [JP] | Japan | 9-270867 |

[51] Int. Cl.[7] .......... C08J 3/02

[52] U.S. Cl. .......... 524/504; 524/523; 524/524; 524/528; 525/80; 525/79; 525/190; 525/263; 525/302; 525/307; 525/308

[58] Field of Search .......... 525/80, 79, 88, 525/94, 190, 263, 302, 307, 308; 524/504, 523, 524, 528

[56] References Cited

U.S. PATENT DOCUMENTS

| | | | |
|---|---|---|---|
| 3,773,855 | 11/1973 | Schrage et al. . | |
| 4,810,767 | 3/1989 | Furukawa et al. | 526/279 |
| 5,346,961 | 9/1994 | Shaw et al. . | |

FOREIGN PATENT DOCUMENTS

| | | |
|---|---|---|
| 0 561 249 | 9/1993 | European Pat. Off. . |
| 0 612 773 | 8/1994 | European Pat. Off. . |
| 1 360 643 | 3/1964 | France . |
| 195 36 558 | 4/1997 | Germany . |
| WO 94/15981 | 7/1994 | WIPO . |

OTHER PUBLICATIONS

Chemical Abstract, vol. 101, No. 14, Oct. 1984, AN 111895u, JP 59 051907, Mar. 26, 1984.

*Primary Examiner*—Mark L. Warzel
*Attorney, Agent, or Firm*—Oblon, Spivak, McClelland, Maier & Neustadt, P.C.

[57] ABSTRACT

There is provided a modified ethylene resin produced by subjecting (a) an ethylene resin to modification with (b) an α,β-unsaturated carboxylic ester having a hydrocarbon-terminated polyalkylene oxide chain, and with (c) an aromatic vinyl compound and/or (d) an ester of an α,β-unsaturated carboxylic acid with an aliphatic alcohol.

There is also provided an ethylene resin composition comprising: (A) 80 to 99.9% by weight of a modified ethylene resin produced by subjecting (a) an ethylene resin to modification at least with (b) an α,β-unsaturated carboxylic ester having a polyalkylene oxide chain; and (B) 20 to 0.1% by weight of a surfactant.

19 Claims, 1 Drawing Sheet

MODIFIED ETHYLENE RESIN HAVING IMPROVED WETTABILITY

BACKGROUND OF THE INVENTION

1. Field of the Invention

The present invention relates to a modified ethylene resin having markedly improved wettability by water while maintaining excellent moldability and appearance of molded products inherent in the ethylene resin. The present invention also relates to an ethylene resin composition comprising a modified ethylene resin and a surfactant, the ethylene resin composition being excellent in antifogging properties and antistatic properties, particularly in permanence of these properties.

2. Background Art

Ethylene resins, such as polyethylene and ethylene/vinyl acetate copolymer, possess excellent moldability, mechanical strength, transparency, chemical resistance and other properties, and extensively used as films, sheets and the like in packaging materials, agricultural materials and the like.

The ethylene resins, however, have a nonpolar molecular structure and hence are poor in affinity for highly polar materials (hereinafter referred to as "wettability"). They, due to this nature, possess very poor antistatic properties, adhesion, paintability, printability, non-dripping properties (antifogging properties in the case of sheets and films) and other various properties. Therefore, the ethylene resins, when used as films, sheets and the like for packaging, agricultural, and other applications, permit water vapor confined in the interior to be deposited as water droplets on the inside of the films, sheets and the like, disadvantageously making it difficult to see the contents or inhibiting the transmission of sunlight, despite the fact that the transparency of the films and the sheets is maintained, or otherwise are electrified to permit dust to be easily deposited. Thus, the films, sheets and the like prepared from the ethylene resins suffer from poor antifogging properties and antistatic properties.

In order to solve the above drawbacks, incorporation of a surfactant into the ethylene resin has been carried out for a long time. This, however, causes the surfactant to bleed out in an early stage and hence cannot realize permanence of the contemplated antifogging properties and antistatic properties. Thus, imparting the antifogging properties and antistatic properties, particularly the permanence of these properties, has been a task to be accomplished in the art for a long time.

On the other hand, (graft) modification of an olefin resin with a specific modifier in order to improve the wettability of the olefin resin is known in the art.

For example, Japanese Patent Laid-Open No. 140449/1979 discloses a modified propylene resin, having improved adhesion, produced by melt-mixing a propylene resin with a compound, as a modifier, which is an ester of polyhydric alcohol with acrylic acid or methacrylic acid and has in its molecule at least one hydroxyl group, for example, polyethylene glycol (meth)acrylate having a terminal hydroxyl group, in the presence of an organic peroxide. This publication, however, does not teach the modification of ethylene resin by this method.

Japanese Patent Laid-Open No. 256430/1994 discloses a modified olefin resin produced by melt-kneading an olefin resin (particularly propylene resin) with a hydroxyl-containing α,β-unsaturated carboxylic ester (for example, a (meth)acrylic ester having a hydroxyl-terminated polyethylene oxide chain or polypropylene oxide chain) and an aromatic vinyl compound (for example, styrene) as modifiers in the presence of a radical initiator. Although this publication refers to an ethylene resin as a resin to be modified, the working examples describe only modified propylene resin.

According to studies conducted by the present inventors, modification of an ethylene resin with such a modifier (grafting agent) as described in the above publications cannot provide a modified ethylene resin possessing wettability improved to a satisfactory level for practical use while maintaining good appearance of molded products. Further, as far as the present inventors know, up to now, use of the above (graft) modified olefin resin in combination with a surfactant has not been reported.

SUMMARY OF THE INVENTION

It is therefore an object of the present invention to provide a modified ethylene resin having significantly improved wettability without sacrificing excellent appearance of molded products inherent in the ethylene resin. Another object of the present invention is to provide an ethylene resin composition having improved antifogging properties and antistatic properties, particularly markedly improved permanence of these properties, and to provide a film or sheet comprising the ethylene resin composition.

In order to attain the above objects of the present invention, according to one aspect of the present invention, there is provided a modified ethylene resin produced by subjecting (a) an ethylene resin to modification with (b) an α,β-unsaturated carboxylic ester having a hydrocarbon-terminated polyalkylene oxide chain, and with (c) an aromatic vinyl compound and/or (d) an ester of an α,β-unsaturated carboxylic acid with an aliphatic alcohol.

According to another aspect of the present invention, there is provided an ethylene resin composition comprising: (A) 80 to 99.9% by weight of a modified ethylene resin produced by subjecting (a) an ethylene resin to modification at least with (b) an α,β-unsaturated carboxylic ester having a polyalkylene oxide chain; and (B) 20 to 0.1% by weight of a surfactant.

In the above composition, the component (b) as a modifier is preferably (b') an α,β-unsaturated carboxylic ester having a hydrocarbon-terminated polyalkylene oxide chain. Further, according to a preferred embodiment of the present invention, the component (A) is a modified ethylene resin produced by subjecting the ethylene resin to modification with, in addition to the modifier (b), (c) an aromatic vinyl compound and/or (d) an ester of an α,β-unsaturated carboxylic acid with an aliphatic alcohol.

DETAILED DESCRIPTION OF THE INVENTION

[Modified ethylene resin]

Component (a): Ethylene resin

Figure 1:
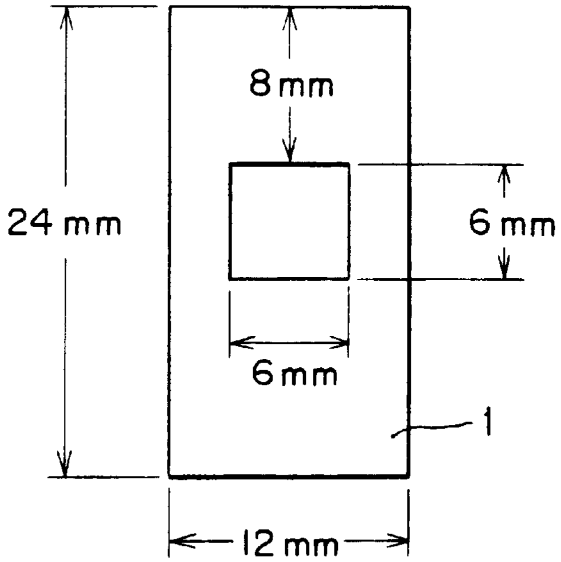
FIG. 1 is a plan view showing the shape and dimension of a specimen for the measurement of dynamic contact angle described in working examples.

Ethylene resins usable as a base of the modified ethylene resin of the present invention include, for example, (branched or straight-chain) homopolymers of ethylene, such as low-density, medium-density, and high-density polyethylenes, copolymers of ethylene with α-olefins, such as propylene, 1-butene, 3-methyl-1-butene, 1-pentene, 3-methyl-1-pentene, 4-methyl-1-pentene, 1-hexene, 1-octene, and 1-decene, and copolymers of ethylene with vinyl esters, such as vinyl acetate, or with other monomers, such as acrylic acid, methacrylic acid, or esters thereof. The comonomer content of the ethylene copolymer is preferably 1 to 30% by weight.

Among the ethylene resins, the homopolymer of ethylene is preferably high-pressure, low-density polyethylene. Preferred ethylene copolymers include ethylene/1-butene copolymer, ethylene/1-hexene copolymer, ethylene/1-octene copolymer, and ethylene/vinyl acetate copolymer.

Component (b): α,β-Unsaturated carboxylic ester having polyalkylene oxide chain

The component (b) as a modifier for the ethylene resin is an α,β-unsaturated carboxylic acid ester having a polyalkylene oxide chain $—(R_1O)_n—R_2$ wherein $R_1$ represents an alkylene group and $R_2$ represents H or a hydrocarbon group. Representative α,β-unsaturated carboxylic acids usable herein include, for example, monocarboxylic acids, such as acrylic acid and methacrylic acid, and dicarboxylic acids, such as maleic acid and fumaric acid. Among them, acrylic acid and methacrylic acid are preferred. For dicarboxylic acids, both monoesters and diesters may be used.

Alkylene oxides include, for example, polymethylene oxide, polyethylene oxide, polypropylene oxide, and polybutylene oxide. The average degree of polymerization n of the polyalkylene oxide is generally 2 to 100, preferably 2 to 50.

According to a preferred embodiment of the present invention, the end of the polyalkylene oxide chain is substituted with a hydrocarbon group, that is, the end group $R_2$ in the above formula is a hydrocarbon group. Hydrocarbon groups as the end group include straight-chain, branched, and cyclic, aliphatic and aromatic hydrocarbon groups. Specific examples thereof include aliphatic hydrocarbon groups having 1 to 25 carbon atoms, alicyclic hydrocarbon groups having 5 to 12 carbon atoms, and aromatic hydrocarbon groups having 6 to 12 carbon atoms, for example, methyl, ethyl, propyl, n-butyl, iso-butyl, t-butyl, pentyl, hexyl, cyclohexyl, heptyl, octyl, nonyl, decyl, undecyl, dodecyl, tridecyl, tetradecyl, pentadecyl, hexadecyl, heptadecyl, octadecyl, nonadecyl, and eicosyl groups. Among them, aliphatic hydrocarbon groups having 1 to 25 carbon atoms and alicyclic hydrocarbon groups having 5 to 12 carbon atoms are preferred with aliphatic hydrocarbon groups having 1 to 25 carbon atoms being particularly preferred.

The amount of the component (b) used is generally 0.1 to 50 parts by weight, preferably 1 to 25 parts by weight, particularly preferably 1 to 20 parts by weight, based on 100 parts by weight of the ethylene resin (component (a)). When the amount of the component (b) is less than 0.1 part by weight, the desired modification effect cannot be attained. On the other hand, when the amount of the component (b) exceeds 50 parts by weight, the amount of the modifier component remaining unreacted is so large that problems such as sticking of molded products occur.

Component (c): Aromatic vinyl compound

According to the present invention, use of the aromatic vinyl compound is preferred because the appearance of molded products and the moldability can be further improved.

Aromatic vinyl compounds usable as the component (c) include, for example, styrene, α-methylstyrene, α-methoxystyrene, methylstyrene, dimethylstyrene, 2,4,6-trimethylstyrene, chlorostyrene, dichlorostyrene, bromostyrene, nitrostyrene, chloromethylstyrene, cyanostyrene, t-butylstyrene, and vinylnaphthalene. Among them, styrene is preferred. They may be used alone or as a mixture of two or more.

The amount of the aromatic vinyl compound used is generally 0.01 to 50 parts by weight, preferably 0.1 to 20 parts by weight, particularly preferably 1 to 10 parts by weight, based on 100 parts by weight of the ethylene resin (component (a)). When the amount of the aromatic vinyl compound used is less than 0.01 part by weight, the desired modification effect cannot be attained, while when the amount exceeds 50 parts by weight, the degree of modification is saturated.

Component (d): Ester of α,β-unsaturated carboxylic acid with aliphatic alcohol

Representative examples of α,β-unsaturated carboxylic acids usable in the ester of an α,β-unsaturated carboxylic acid with an aliphatic alcohol include, for example, monocarboxylic acids, such as acrylic acid and methacrylic acid, and dicarboxylic acids, such as maleic acid and fumaric acid. Among them, acrylic acid and methacrylic acid are preferred. For dicarboxylic acids, both monoesters and diesters may be used. Use of the ester of an α,β-unsaturated carboxylic acid with an aliphatic alcohol can maintain good appearance of molded products without sacrificing the wettability, antifogging properties, antistatic properties, and permanence of these properties.

The aliphatic hydrocarbon group in the aliphatic alcohol is generally a straight-chain aliphatic group having 1 to 25 carbon atoms. This group may have a branched or cyclic structure and in addition may have an unsaturated bond. Examples of aliphatic hydrocarbon group usable herein include methyl, ethyl, propyl, n-butyl, iso-butyl, t-butyl, pentyl, hexyl, cyclohexyl, heptyl, octyl, nonyl, decyl, undecyl, dodecyl, tridecyl, tetradecyl, pentadecyl, hexadecyl, heptadecyl, octadecyl, nonadecyl, and eicosyl.

The amount of the component (d) used is generally 0.1 to 50 parts by weight, preferably 0.5 to 20 parts by weight, based on 100 parts by weight of the ethylene resin (component (a)). When the amount of the component (d) is less than 0.1 part by weight, the desired modification effect cannot be attained. On the other hand, when the amount of the component (d) exceeds 50 parts by weight, the modifier component remaining unreacted is so large that problems such as sticking of molded products occur.

Additional components

The modified ethylene resin of the present invention may further comprise at least one polymer selected from polymers other than the above ethylene resins with the proviso that they have little, if any, adverse influence on the intended effect according to the present invention.

Further, well-known optional components commonly used as additives for polyolefin resins, such as antioxidants, weather resistance improvers, nucleating agents, flame retardants, plasticizers, fluidity improvers, release agents, slip agents, antiblocking agents, heat insulating agents, colorants, and dispersants, may be used as additional components with the proviso that they have little, if any, adverse influence on the intended effect according to the present invention. Further, organic or inorganic fillers and reinforcements, particularly glass fibers, mica, talc, wollastonite, potassium titanate, potassium carbonate, and silica, may also be added to the modified ethylene resin of the present invention from the viewpoint of improving the rigidity, heat resistance, dimensional accuracy and the like.

These optional component(s) may be added in any stage of the step of modification (step of grafting), for example, before, during, or after melt kneading. Further, the optional component(s) may be added in the course of the production of the ethylene resin composition described below.

[Production of modified ethylene resin]

The modified ethylene resin of the present invention may be produced by subjecting the ethylene resin (component (a)) to modification (grafting) with the component (b) and the component (c) and/or the component (d) as modifiers in the presence of the following radical initiator. The modification (grafting) may be carried out by any of conventional methods, such as a melt kneading method, a solution method, and suspension method. For example, according to the solution method, the ethylene resin and the modifier are dissolved in a solvent, preferably a halogen-substituted or halogen-unsubstituted aromatic hydrocarbon solvent having a boiling point of 100° C. or above, for example, chlorobenzene or xylene, and a reaction is generally allowed to proceed at a temperature of about 80 to 120° C. for about 2 to 8 hr, thereby modifying the ethylene resin.

According to a preferred embodiment of the present invention, however, the modification is carried out by the melt kneading method which will be described in detail.

Radical initiator

Radical initiators usable in the present invention include: organic or inorganic peroxides, such as t-butyl hydroperoxide, cumene hydroperoxide, 2,5-dimethylhexane-2,5-dihydroperoxide, t-butyl peroxybenzoate, benzoyl peroxide, dicumyl peroxide, 1,3-bis(t-butylperoxyisopropyl)benzene, dibutyl peroxide, methyl ethyl ketone peroxide, potassium peroxide, and hydrogen peroxide; azo compounds, such as 2,2-azobisisobutyronitrile, 2,2-azobis(isobutylamide) dihalide, 2,2-azobis[2-methyl-N-(2-hydroxyethylpropionamide)], and azodi-t-butane; and carbon radical generators, such as dicumyl. These radical initiators may also be used as a solution thereof in an organic solvent.

The amount of the radical initiator used is generally 0.01 to 10 parts by weight, preferably 0.02 to 5 parts by weight, particularly preferably 0.02 to 0.5 part by weight, based on 100 parts by weight of the ethylene resin (component (a)).

When the amount of the radical initiator is below the lower limit of the above range, the degree of grafting is unsatisfactory. On the other hand, when the amount of the radical initiator exceeds the upper limit of the above range, the ethylene polymer resin is significantly deteriorated, resulting in deteriorated moldability of the modified ethylene resin.

Melt kneading

The ethylene resin and the modifier are melt-kneaded and reacted with each other by means of Plastomill, a uniaxial or biaxial kneader, a horizontal biaxial agitator, such as a horizontal biaxial multidisk apparatus or a horizontal biaxial surface renewer, or a vertical agitator, such as a double helical ribbon agitator, generally at a temperature of 120 to 300 ° C., preferably 140 to 250° C., generally for 0.01 to 10 min, preferably 0.1 to 5 min, in the presence of the radical initiator. The modifier and the radical initiator may be added by a method wherein they are dry blended at a time with the ethylene resin followed by kneading of the blend, a method wherein any of the modifier and the radical initiator is dry blended with the ethylene resin and the remainder is added during kneading of the blend, or a method wherein the modifier and the radical initiator are added to molten ethylene resin. In this case, if necessary, an organic solvent, such as xylene, may be added, for example, in an amount of 0.1 to 5 parts by weight based on 100 parts by weight of the ethylene resin, from the viewpoint of modifying the viscosity and improving the reaction rate during kneading. Preferably, the interior of the kneader or agitator is evacuated, for example, to about 0.1 to 10 mmHg, in order to remove the unreacted modifier and the additive solvent.

[Ethylene resin composition]

The ethylene resin composition according to the second aspect of the present invention comprises: (A) 80 to 99.9% by weight of a modified ethylene resin produced by subjecting (a) an ethylene resin to modification at least with the modifier (b), preferably with the modifier (b) and the modifiers (c) and/or (d); and (B) 20 to 0.1% by weight of a surfactant. The ethylene resin composition of the present invention, as compared with conventional compositions using an unmodified ethylene resin, possesses significantly improved antifogging properties, antistatic properties, and particularly permanence of these properties.

Component (B): Surfactant

Surfactants usable as the component (B) in the present invention include nonionic, cationic, anionic, and amphoteric surfactants. They may be used alone or as a mixture of two or more.

Nonionic surfactants include: ethers of polyethylene glycol, such as polyethylene glycol nonylphenyl ether and polyethylene glycol stearyl ether; carboxylic esters of polyethylene glycol, such as polyethylene glycol stearate and polyethylene glycol dilaurate; partial carboxylic esters of polyhydric alcohols, such as glycerin monostearate, sorbitan monolaurate, sorbitan monopalmitate, and sorbitan monostearate; polyalkylene oxide adducts of partial carboxylic esters of polyhydric alcohols, such as polyethylene oxide adducts of sorbitan monostearate and sorbitan monolaurate; and amide derivatives, such as N,N-di-(hydroxyethyl)-laurylamide and N-(2-hydroxypropyl)-stearoamide.

Cationic surfactants usable herein include: quaternary ammonium salts, such as lauryltrimethylammonium chloride, N,N-dimethyl-N-hydroxyethyl-3-stearoamido-propylammonium nitrate; imidazoline derivatives, such as 2-octadecyl-hydroxyethyl-2-imidazoline; and amines, such as N,N-diethyl-stearoamido-methylamine hydrochlorides and polyoxyethylenestearylamine.

Anionic surfactants usable herein include: phosphates, such as sodium lurylphosphate and sodium polyoxyethylene-laurylphosphate; sulfates, such as sodium laurylsulfate and sodium salt of sulfated oleic acid; and salts of sulfonic acid, such as sodium stearylsulfonate, triethanolamine salt of dodecylbenzenesulfonic acid, and sodium dioctylsulfosuccinate.

Amphoteric surfactants usable herein include alkylbetaine type, alkylimidazoline type, and alkylalanine type amphoteric surfactants.

Among the surfactants, nonionic surfactants having excellent compatibility with the ethylene resin is preferred as the surfactant for imparting the antifogging properties. Among others, partial esters of polyhydric alcohols, such as sorbitan, sorbitol, mannitan, mainnitol, glycerin, and polyglycerins, such as diglycerin, with fatty acids having 12 to 22 carbon atoms, and ethylene oxide or propylene oxide adducts (addition amount in mole: 1 to 20) thereof, are preferred.

From the viewpoint of imparting the antistatic properties, preferred are nonionic surfactants, such as ethers of polyethylene glycol and partial carboxylic esters of (poly) glycerin, cationic surfactants, such as quaternary ammonium salts and amines, and anionic surfactants, such as salts of sulfonic acid. Among them, nonionic surfactants having excellent compatibility with the ethylene resin is particularly preferred.

The ethylene resin composition of the present invention generally comprises 80 to 99.9% by weight of the component (A) and 20 to 0.1% by weight of the component (B), preferably comprises 90 to 99.5% by weight of the component (A) and 10 to 0.5% by weight of the component (B). When the proportion of the component (B) is less than 0.1% by weight, the antifogging properties, the antistatic properties, and the permanence of these properties are unsatisfactory. On the other hand, when a proportion of the component (B) exceeding 20% by weight disadvantageously makes it difficult to homogeneously incorporate the component (B) into the component (A) and in addition results in deteriorated transparency of the resultant film or sheet.

Production of composition

The ethylene resin composition of the present invention may be prepared by intimately mixing the components (A) and (B) together by means of a Henschel mixer, a ribbon blender, a V type blender or the like and then kneading the mixture at a temperature of 300° C. or below by means of a uniaxial or multiaxial kneader-extruder, a roll, a Banbury mixer or the like. Alternatively, the surfactant as the component (B) may be incorporated in the course of the production of the modified ethylene resin as the component (A).

[Molding]

The ethylene resin composition of the present invention may be molded into desired products by various molding methods commonly used in molding of thermoplastic resins, that is, injection molding, extrusion, blow molding, compression molding, and thermoforming. In addition, it may be molded by T-die molding, inflation process into films, sheets and other products which may be favorably used as covering materials, such as agricultural green houses and tunnels, and packaging materials, such as perishables, and the like.

The following examples further illustrate the present invention but are not intended to limit it.

EXAMPLES I-1 TO I-8 AND COMPARATIVE EXAMPLES I-1 TO I-7

The following materials were used.

Component (a): Polyethylene

LF581X: Low-density polyethylene (Novatec LF581X manufactured by Japan Polychem Corporation, MFR (190° C., load 2.16 kg (21.2 N))=4 g/10 min, density=0.931 g/cm$^3$)

LJ900: Low-density polyethylene (Novatec LJ900 manufactured by Japan Polychem Corporation, MFR (190° C., load 2.16 kg (21.2 N))=45 g/10 min, density=0.918 g/cm$^3$)

Component (b): α,β-Unsaturated carboxylic ester having polyalkylene oxide chain

PME200: Methoxy-terminated polyethylene oxide monomethacrylate (Blemmer PME200 manufactured by NOF Corporation, degree of polymerization of polyethylene oxide=4)

PME400: Methoxy-terminated polyethylene oxide monomethacrylate (Blemmer PME400 manufactured by NOF Corporation, degree of polymerization of polyethylene oxide=9)

PE200: Hydroxyl-terminated polyethylene oxide monomethacrylate (Blemmer PE200 manufactured by NOF Corporation, degree of polymerization of polyethylene oxide=4 to 5)

PE350: Hydroxyl-terminated polyethylene oxide monomethacrylate (Blemmer PE350 manufactured by NOF Corporation, degree of polymerization of polyethylene oxide=7 to 9)

Component (c): Aromatic vinyl compound

Styrene: guaranteed reagent manufactured by Wako Pure Chemical Industries, Ltd.

Component (d): Ester of α,β-unsaturated carboxylic acid with aliphatic alcohol

BMA: n-butyl methacrylate (Blemmer BMA manufactured by NOF Corporation)

CHMA: cyclohexyl methacrylate (Blemmer CHMA manufactured by NOF Corporation)

SLMA: lauryl methacrylate (Blemmer SLMA manufactured by NOF Corporation)

SMA: stearyl methacrylate (Blemmer SMA manufactured by NOF Corporation)

Radical initiator:

Perkadox 14: 1,3-bis(t-butylperoxyisopropyl)benzene (manufactured by Kayaku Akzo Corporation)

[Production of modified ethylene resin]

In Examples I-1 to I-3 and Comparative Examples I-1 to I-5, components listed in Table 1 were thoroughly mixed together in super-mixer, and the mixtures were melt-kneaded in Labo Plastomill manufactured by Toyo Seiki Seisaku-Sho, Ltd., with the cylinder temperature set at 180° C., at 100 rpm for 2 min, thereby preparing modified ethylene resins.

In Examples I-4 to I-8 and Comparative Examples I-6 and I-7, components listed in Table 2 were thoroughly mixed together in a super-mixer, and the mixtures were melt-kneaded in a twin-screw extruder TEX44 (L/D =32) manufactured by The Japan Steel Works, Ltd., with the cylinder temperature set at 180° C., under conditions of 200 rpm and throughput 40 kg/hr, thereby preparing modified ethylene resins.

[Measurement]

For the modified ethylene resins thus prepared, the following measurements were carried out.

Melt flow rate (MFR)

Measured at 190° C. under a load of 2.16 kg (21.2 N) with a melt indexer manufactured by Toyo Seiki Seisaku-Sho, Ltd. according to JIS K 7210.

Dynamic contact angle

In Examples I-1 to I-3 and Comparative Examples I-1 to I-5, the modified ethylene resins were press-molded at 200° C. to prepare about 100 μm-thick films.

In Examples I-4 to I-8 and Comparative Examples I-6 and I-7, the modified ethylene resins were molded by means of an inflation system having Labo Plastomill manufactured by Toyo Seiki Seisaku-Sho, Ltd. with the cylinder temperature set at 180° C. into 50 μm-thick films.

Figure 2:
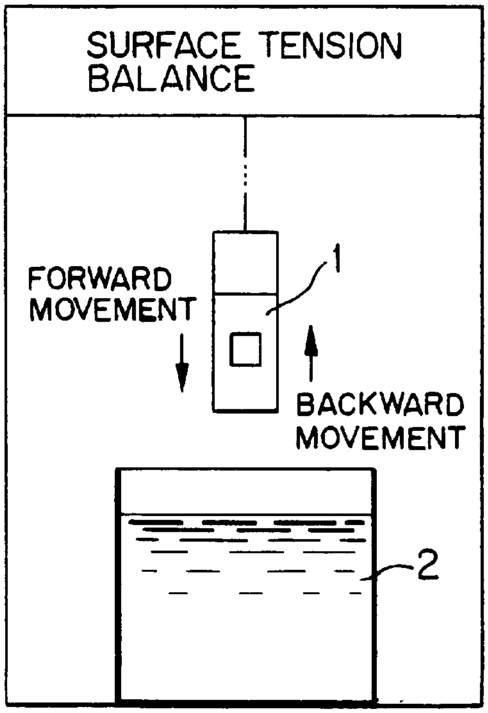
FIG. 2 is a diagram illustrating a method for measuring the dynamic contact angle.

A specimen 1 having a shape shown in FIG. 1 was stamped out from the film, and the dynamic contact angle was measured with a surface tension balance manufactured by Shimadzu Corporation by moving the test piece 1 forward or backward at a moving speed of 5 mm/min in distilled water 2 as shown in FIG. 2.

Appearance of molded product

The modified ethylene resins were molded by means of an inflation system having Labo Plastomill manufactured by Toyo Seiki Seisaku-Sho, Ltd. with the cylinder temperature set at 180° C. into about 50 μm-thick films.

For the films, the number of fish eyes was measured. The results were evaluated according to the following criteria.

Evaluation criteria:

◎: Not more than 10 fish eyes/1200 $cm^2$

○: 11 to 20 fish eyes/1200 $cm^2$

Δ: 21 to 50 fish eyes/1200 $cm^2$

X: Not less than 51 fish eyes/1200 $cm^2$

The results of measurements and evaluation are shown in Tables 1 and 2.

TABLE 1

| | Ex. I-1 | Ex. I-2 | Ex. I-3 | Comp. Ex. I-1 | Comp. Ex. I-2 | Comp. Ex. I-3 | Comp. Ex. I-4 | Comp. Ex. I-5 |
|---|---|---|---|---|---|---|---|---|
| Formulation | | | | | | | | |
| Component (a): polyethylene (pts. wt.) | LF581X 100 | LF581X 100 | LJ900 100 | LF581X 100 | LF581X 100 | LF581X 100 | LF581X 100 | LF581X 100 |
| Component (b): α,β-unsaturated carboxylic ester having polyalkylene oxide chain (pts. wt.) | PME400 10 | PME200 10 | PME400 10 | PE200 10 | PE350 10 | PE200 10 | PE350 10 | — |
| Component (c): aromatic vinyl compound (pts. wt.) | — | Styrene 5 | Styrene 5 | Styrene 5 | Stylene 5 | — | — | — |
| Radical initiator (pts. wt.) | Perkadox 14 0.2 | Perkadox 14 0.2 | Perkadox 14 0.2 | Perkadox 14 0.2 | Perkadox 14 0.2 | Perkadox 14 0.2 | Perkadox 14 0.2 | — — |
| Evaluation | | | | | | | | |
| MFR (g/10 min) | 4.5 | 2.0 | 1.8 | 1.8 | 1.2 | 4.8 | 5.5 | 4.0 |
| Dynamic contact angle | | | | | | | | |
| Forward (°) | 76 | 89 | 72 | 99 | 100 | 90 | 99 | 109 |
| Backward (°) | 45 | 62 | 34 | 80 | 72 | 75 | 73 | 95 |
| Appearance of molded product | ○ | ◎ | ◎ | Δ | Δ | Δ | X | ◎ |

TABLE 2

| | Ex. I-4 | Ex. I-5 | Ex. I-6 | Ex. I-7 | Ex. I-8 | Comp. Ex. I-6 | Comp. Ex. I-7 |
|---|---|---|---|---|---|---|---|
| Formulation | | | | | | | |
| Component (a): polyethylene (pts. wt.) | LF581X 100 | LF581X 100 | LF581X 100 | LF581X 100 | LF581X 100 | LF581X 100 | LF581X 100 |
| Component (b): α,β-unsaturated carboxylic ester having polyalkylene oxide chain (pts. wt.) | PME200 10 | PME200 10 | PME200 10 | PME200 10 | PME200 10 | PE200 10 | PE200 10 |
| Component (c): aromatic vinyl compound (pts. wt.) | — — | Styrene 3 | Styrene 3 | Styrene 3 | Styrene 3 | Styrene 3 | — — |
| Component (d): ester of α,β-unsaturated carboxylic acid with aliphatic alcohol (pts. wt.) | SMA 5 | BMA 5 | CHMA 5 | SLMA 5 | SMA 5 | — — | — — |
| Radical initiator (pts. wt.) | Perkadox 14 0.2 | Perkadox 14 0.2 | Perkadox 14 0.2 | Perkadox 14 0.2 | Perkadox 14 0.2 | Perkadox 14 0.2 | Perkadox 14 0.2 |

TABLE 2-continued

| | Ex. I-4 | Ex. I-5 | Ex. I-6 | Ex. I-7 | Ex. I-8 | Comp. Ex. I-6 | Comp. Ex. I-7 |
|---|---|---|---|---|---|---|---|
| Evaluation | | | | | | | |
| MFR (g/10 min) | 3.8 | 3.2 | 3.5 | 4.4 | 3.8 | 2.8 | 5.2 |
| Dynamic contact angle | | | | | | | |
| Forward (°) | 77 | 85 | 85 | 73 | 80 | 96 | 90 |
| Backward (°) | 59 | 61 | 53 | 60 | 63 | 78 | 73 |
| Appearance of molded product | ◎ | ◎ | ◎ | ◎ | ◎ | ○ | Δ |

EXAMPLES II-1 TO II-33 AND COMPARATIVE EXAMPLES II-1 to II-6

The following materials were used.

Component (A): Modified ethylene resin

Production Example 1

100 parts by weight of low-density polyethylene (density 0.919 g/$cm^3$, melt flow rate 2.0 g/10 min as measured under conditions of 190° C. and load 2.16 kg; hereinafter referred to as "LDPE"), 10 parts by weight of an ester of polyethylene oxide with methacrylic acid (degree of polymerization of polyethylene oxide 7 to 9, "Blemmer PE350," manufactured by NOF Corporation; hereinafter referred to as "PE350"), and 0.2 part by weight of 1,3-bis(t-butylperoxyisopropyl)benzene ("Perkadox 14," manufactured by Kayaku Akzo Corporation) were dry blended together, and the mixture was kneaded by means of a biaxial kneader ("TEX-30," manufactured by The Japan Steel Works, Ltd.) in vacuo under conditions of temperature 180° C., 250 rpm, and throughput 10 kg/hr to modify the polyethylene, thereby producing a modified ethylene resin 1 having an amount of PE350 added of 2.7% by weight and a melt flow rate of 4.5 g/10 min.

Production Example 2

The procedure of Production Example 1 was repeated, except that the amount of PE350 used was changed to 5 parts by weight. Thus, a modified ethylene resin 2 having an amount of PE350 added of 1.5% by weight and a melt flow rate of 4.1 g/10 min was produced.

Production Example 3

The procedure of Production Example 1 was repeated, except that 5 parts by weight of styrene was used together with 10 parts by weight of PE350. Thus, a modified ethylene resin 3 having an amount of PE350 added of 5.2% by weight and a melt flow rate of 1.5 g/10 min was produced.

Production Example 4

The procedure of Production Example 3 was repeated, except that the amount of styrene used was changed to 10 parts by weight. Thus, a modified ethylene resin 4 having an amount of PE350 added of 5.8% by weight and a melt flow rate of 1.0 g/10 min was produced.

Production Example 5

The procedure of Production Example 1 was repeated, except that an ester of polyethylene oxide having a terminal methyl group with methacrylic acid (degree of polymerization of polyethylene oxide 4, "Blemmer PME200," manufactured by NOF Corporation; hereinafter referred to as "PME200") was used instead of PE350. Thus, a modified ethylene resin 5 having an amount of PME200 added of 2.8% by weight and a melt flow rate of 5.0 g/10 min was produced.

Production Example 6

The procedure of Production Example 1 was repeated, except that an ester of polyethylene oxide having a terminal methyl group with methacrylic acid (degree of polymerization of polyethylene oxide 9, "Blemmer PME400," manufactured by NOF Corporation; hereinafter referred to as "PME400") was used instead of PE350. Thus, a modified ethylene resin 6 having an amount of PME400 added of 2.0% by weight and a melt flow rate of 5.2 g/10 min was produced.

Production Example 7

The procedure of Production Example 1 was repeated, except that an ethylene/vinyl acetate copolymer (vinyl acetate content 5% by weight, melt flow rate 3.0 g/10 min as measured under conditions of 190° C. and load 2.16 kg; hereinafter referred to as "EVA") was used instead of LDPE. Thus, a modified ethylene resin 7 having a melt flow rate of 2.5 g/10 min was produced. Addition of an ethylene oxide group added to the modified ethylene resin 7 has been confirmed by the presence of a peak around 1100 $cm^{-1}$ in an infrared absorption spectrum.

Production Example 8

The procedure of Production Example 7 was repeated, except that 5 parts by weight of styrene was used together with 10 parts by weight of PE350. Thus, a modified ethylene resin 8 having a melt flow rate of 0.9 g/10 min was produced. Addition of an ethylene oxide group added to the modified ethylene resin 8 has been confirmed by the presence of a peak around 1100 $cm^{-1}$ in an infrared absorption spectrum.

Production Example 9

100 parts by weight of low-density polyethylene (density 0.919 g/$cm^3$, melt flow rate 2.0 g/10 min as measured under conditions of 190° C. and load 2.16 kg; hereinafter referred to as "LDPE"), 10 parts by weight of an ester of polyethylene oxide having a terminal methyl group with methacrylic acid (degree of polymerization of polyethylene oxide 4, "Blemmer PME200," manufactured by NOF Corporation; hereinafter referred to as "PME200"), 5 parts by weight of styrene, and 0.2 part by weight of 1,3-bis(t-butylperoxyisopropyl)benzene ("Perkadox 14," manufactured by Kayaku Akzo Corporation) were dry blended together, and the mixture was kneaded by means of a biaxial kneader ("TEX-30," manufactured by The Japan Steel Works, Ltd.) in vacuo under conditions of temperature 180° C., 250 rpm, and throughput 10 kg/hr to modify the polyethylene, thereby producing a modified ethylene resin 9 having an amount of PME200 added of 4.9% by weight, an amount of styrene added of 2.5% by weight, and a melt flow rate of 2.1 g/10 min.

Production Example 10

The procedure of Production Example 9 was repeated, except that the amount of styrene used was changed to 10 parts by weight. Thus, a modified ethylene resin 10 having an amount of PME200 added of 5.7% by weight, an amount of styrene added of 4.8% by weight, and a melt flow rate of 1.9 g/10 min was produced.

Production Example 11

The procedure of Production Example 9 was repeated, except that an ester of polyethylene oxide having a terminal methyl group with methacrylic acid (degree of polymerization of polyethylene oxide 9, "Blemmer PME400," manufactured by NOF Corporation; hereinafter referred to as "PME400") was used instead of PME200. Thus, a modified ethylene resin 11 having an amount of PME400 added of 3.9% by weight, an amount of styrene added of 2.8% by weight, and a melt flow rate of 2.5 g/10 min was produced.

Production Example 12

The procedure of Production Example 11 was repeated, except that the amount of PME400 used was changed to 5 parts by weight. Thus, a modified ethylene resin 12 having an amount of PME400 added of 2.1% by weight, an amount of styrene added of 2.3% by weight, and a melt flow rate of 1.9 g/10 min was produced.

Production Example 13

The procedure of Production Example 11 was repeated, except that the amount of styrene used was changed to 10 parts by weight. Thus, a modified ethylene resin 13 having an amount of PME400 added of 4.8% by weight, an amount of styrene added of 4.9% by weight, and a melt flow rate of 1.5 g/10 min was produced.

Production Example 14

The procedure of Production Example 11 was repeated, except that an ethylene/vinyl acetate copolymer (vinyl acetate content 5% by weight, melt flow rate 3.0 g/10 min as measured under conditions of 190° C. and load 2.16 kg; hereinafter referred to as "EVA") was used instead of LDPE. Thus, a modified ethylene resin 14 having an amount of styrene added of 2.1% by weight and a melt flow rate of 1.2 g/10 min was produced. Addition of an ethylene oxide group added to the modified ethylene resin 14 has been confirmed by the presence of a peak around 1100 $cm^{-1}$ in an infrared absorption spectrum.

Production Example 15

The procedure of Production Example 14 was repeated, except that the amount of styrene used was changed to 10 parts by weight. Thus, a modified ethylene resin 15 having an amount of styrene added of 3.9% by weight and a melt flow rate of 0.9 g/10 min was produced. Addition of an ethylene oxide group added to the modified ethylene resin 15 has been confirmed by the presence of a peak around 1100 $cm^{-1}$ in an infrared absorption spectrum.

Production Example 16

100 parts by weight of low-density polyethylene (density 0.919 g/$cm^3$, melt flow rate 2.0 g/10 min as measured under conditions of 190° C. and load 2.16 kg; hereinafter referred to as "LDPE"), 5 parts by weight of an ester of polyethylene oxide having a terminal methyl group with methacrylic acid (degree of polymerization of polyethylene oxide 4 to 5, "Blemmer PME200," manufactured by NOF Corporation; hereinafter referred to as "PME200"), 5 parts by weight of cetyl methacrylate ("Blemmer CMA," manufactured by NOF Corporation; hereinafter referred to as "CMA"), and 0.05 part by weight of 1,3-bis(t-butyl peroxyisopropyl) benzene ("Perkadox 14," manufactured by Kayaku Akzo Corporation) were dry blended together, and the blend was kneaded by means of a biaxial kneader ("TEX-30," manufactured by The Japan Steel Works, Ltd.) in vacuo under conditions of temperature 170° C., 250 rpm, and throughput 10 kg/hr to modify the polyethylene, thereby producing a modified ethylene resin 16 having an amount of the modifier added of 0.29% by mole and a melt flow rate of 1.9 g/10 min.

Production Example 17

The procedure of Production Example 16 was repeated, except that 5 parts by weight of styrene was used together with 5 parts by weight of PME200 and 5 parts by weight of CMA. Thus, a modified ethylene resin 17 having an amount of the modifier added of 0.54% by mole and a melt flow rate of 1.1 g/10 min was produced.

Production Example 18

The procedure of Production Example 16 was repeated, except that 5 parts by weight of styrene was used together with 8 parts by weight of PME200 and 2 parts by weight of CMA. Thus, a modified ethylene resin 18 having an amount of the modifier added of 0.46% by mole and a melt flow rate of 0.9 g/10 min was produced.

Production Example 19

The procedure of Production Example 17 was repeated, except that 5 parts by weight of an ester of polyethylene oxide having a terminal methyl group with methacrylic acid (degree of polymerization of polyethylene oxide 9, "Blemmer PME400, " manufactured by NOF Corporation; hereinafter referred to as "PME400") was used instead of PME200. Thus, a modified ethylene resin 19 having an amount of the modifier added of 0.58% by mole and a melt flow rate of 1.3 g/10 min was produced.

Production Example 20

The procedure of Production Example 19 was repeated, except that 5 parts by weight of lauryl methacrylate ("Blemmer SLMA," manufactured by NOF Corporation; hereinafter referred to as "SLMA") was used instead of CMA. Thus, a modified ethylene resin 20 having an amount of the modifier added of 0.61% by mole and a melt flow rate of 1.4 g/10 min was produced.

Production Example 21

The procedure of Production Example 19 was repeated, except that 5 parts by weight of stearyl methacrylate ("Blemmer SMA," manufactured by NOF Corporation; hereinafter referred to as "SMA") was used instead of CMA. Thus, a modified ethylene resin 21 having an amount of the modifier added of 0.56% by mole and a melt flow rate of 1.3 g/10 min was produced.

For each production example, the amount of the modifier added in the modified ethylene resin was determined by pouring a solution of 0.3 g of the modified ethylene resin in 30 ml of xylene at 140° C. into 300 ml of methanol to prepare a purified resin as a precipitate, press-molding the purified resin into a film, subjecting the film to infrared spectrophotometry, and determining the amount of the modifier added in the modified ethylene resin based on the absorption of a carbonyl group around 1724 $cm^{-1}$ in the infrared absorption spectrum using a separately prepared calibration curve.

The melt flow rate (MFR) was measured at 190° C. under a load of 2.16 kg (21.2 N) with a melt indexer manufactured by Toyo Seiki Seisaku-Sho, Ltd. according to JIS K 7210.

Component (B): Surfactant (i) Sorbitan monostearate (hereinafter referred to as "SMS")

(ii) Polyethylene oxide adduct (addition amount in mole: 20) of sorbitan monostearate) (hereinafter referred to as "PEO-SMS")

(iii) Diglycerin monostearate (hereinafter referred to as "DGMS")

Component (C): Adduct component (i) LDPE used in Production Example 1

(ii) EVA used in Production Example 7

[Preparation of ethylene resin composition]

In Examples II-1 to II-26 and Comparative Examples II-1 to II-4, components listed in Tables 3 and 4 were dry blended together, and the blends were kneaded by means of a biaxial kneader ("TEX-30," manufactured by The Japan Steel Works, Ltd.) under conditions of temperature 180° C., 250 rpm, and throughput 10 kg/hr to prepare compositions which were then pelletized and dried in vacuo at 60° C. for 4 hr.

The pellets were subjected to inflation by means of an inflation system under conditions of screw rotation speed 50 rpm and die temperature 180° C. to prepare 50 μm-thick films.

In Examples II-27 to II-33 and Comparative Examples II-5 to II-6, components listed in Table 5 were dry blended together, and the blends were kneaded by means of a biaxial kneader "TEX-30" under conditions of temperature 170° C., 250 rpm, and throughput 10 kg/hr to prepare compositions which were then pelletized and dried under a nitrogen stream at 80° C. for 4 hr.

The pellets were subjected to inflation by means of an inflation system at a die temperature of 180° C. to prepare 100 μm-thick films.

[Evaluation]

The films were evaluated as follows.

Initial antifogging property

About 150 ml of warm water of 50° C. was placed in a beaker, having an internal capacity of 200 ml, provided with an inclined open. The beaker was then covered and hermetically sealed with the specimen film, placed in a thermostatic chamber at 50° C., and allowed to stand at an outside air temperature of 23° C. for one hr. At the end of this period, the inside of the film was inspected for the deposition of water droplets, and the initial antifogging property was evaluated as ○ when a water film was formed and permitted the whole inside of the beaker to be seen; as Δ when water droplets were deposited in an area of not more than 25% making it difficult to see the inside of the beaker; as $\Delta^-$ when water droplets were deposited in an area of more than 25% but less than 50% making it difficult to see the inside of the beaker; and as X when water droplets were deposited in an area of not less than 50% making it difficult to see the inside of the beaker.

Permanence of antifogging property

Evaluated in terms of the number of days necessary for the antifogging property of the film to be evaluated as X according to the evaluation criteria for the initial antifogging property (deposition of water droplets being observed in an area of more than 50%).

Transparency

Measured in terms of haze according to JIS K 7105.

Appearance of molded product

For the films, the number of fish eyes was measured. The results were evaluated according to the following criteria.

◎: Not more than 10 fish eyes/1200 $cm^2$

○: 11 to 20 fish eyes/1200 $cm^2$

Δ: 21 to 50 fish eyes/1200 $cm^2$

X: Not less than 51 fish eyes/1200 $cm^2$

The results are shown in Tables 3 to 5.

TABLE 3

| | Ex. II-1 | Ex. II-2 | Ex. II-3 | Ex. II-4 | Ex. II-5 | Ex. II-6 | Ex. II-7 | Ex. II-8 | Ex. II-9 | Ex. II-10 |
|---|---|---|---|---|---|---|---|---|---|---|
| Component (A) (wt %) | | | | | | | | | | |
| Modified ethylene resin-1 | 70 | 70 | 28 | | | | | | | |
| Modified ethylene resin-2 | | | | 70 | | | | | | |
| Modified ethylene resin-3 | | | | | 70 | 70 | 28 | | | |
| Modified ethylene resin-4 | | | | | | | | 70 | | |
| Modified ethylene resin-5 | | | | | | | | | 70 | 70 |
| Modified ethylene resin-6 | | | | | | | | | | |
| Modified ethylene resin-7 | | | | | | | | | | |
| Modified ethylene resin-8 | | | | | | | | | | |
| Component (B) (wt %) | | | | | | | | | | |
| SMS | 2 | 0.7 | 2 | 2 | 2 | 0.7 | 2 | 2 | 2 | 0.7 |
| PEO-SMS | | 1 | | | | 1 | | | | 1 |
| DGMS | | 0.3 | | | | 0.3 | | | | 0.3 |

TABLE 3-continued

| | | | | | | | | | | |
|---|---|---|---|---|---|---|---|---|---|---|
| Component (C) (wt %) | | | | | | | | | | |
| LDPE | 28 | 28 | 70 | 28 | 28 | 28 | 70 | 28 | 28 | 28 |
| EVA | | | | | | | | | | |
| Antifogging properties | | | | | | | | | | |
| Initial antifogging property | ○ | ○ | ○ | ○ | ○ | ○ | ○ | ○ | ○ | ○ |
| Permanence of antifogging property (days) | >50 | >50 | 43 | 46 | >50 | >50 | 44 | >50 | 40 | 39 |

| | Ex. II-11 | Ex. II-12 | Ex. II-13 | Ex. II-14 | Ex. II-15 | Comp. Ex. II-1 | Comp. Ex. II-2 | Comp. Ex. II-3 | Comp. Ex. II-4 |
|---|---|---|---|---|---|---|---|---|---|
| Component (A) (wt %) | | | | | | | | | |
| Modified ethylene resin-1 | | | | | | | | | |
| Modified ethylene resin-2 | | | | | | | | | |
| Modified ethylene resin-3 | | | | | | | | | |
| Modified ethylene resin-4 | | | | | | | | | |
| Modified ethylene resin-5 | | | | | | | | | |
| Modified ethylene resin-6 | 70 | | | | | | | | |
| Modified ethylene resin-7 | | 70 | 70 | | | | | | |
| Modified ethylene resin-8 | | | | 70 | 70 | | | | |
| Component (B) (wt %) | | | | | | | | | |
| SMS | 2 | 2 | 0.7 | 2 | 0.7 | 2 | 0.7 | 2 | 0.7 |
| PEO-SMS | | | 1 | | 1 | | 1 | | 1 |
| DGMS | | | 0.3 | | 0.3 | | 0.3 | | 0.3 |
| Component (C) (wt %) | | | | | | | | | |
| LDPE | 28 | | | | | 98 | 98 | | |
| EVA | | 28 | 28 | 28 | 28 | | | 98 | 98 |
| Antifogging properties | | | | | | | | | |
| Initial antifogging property | ○ | ○ | ○ | ○ | ○ | ○ | ○ | ○ | ○ |
| Permanence of antifogging property (days) | >50 | 42 | 38 | 46 | 43 | 35 | 32 | 32 | 28 |

TABLE 4

| | Ex. II-16 | Ex. II-17 | Ex. II-18 | Ex. II-19 | Ex. II-20 | Ex. II-21 | Ex. II-22 | Ex. II-23 |
|---|---|---|---|---|---|---|---|---|
| Component (A) (wt %) | | | | | | | | |
| Modified ethylene resin-9 | 70 | 70 | | | | | | |
| Modified ethylene resin-10 | | | 70 | | | | | |
| Modified ethylene resin-11 | | | | 70 | 70 | 28 | | |
| Modified ethylene resin-12 | | | | | | | 70 | |
| Modified ethylene resin-13 | | | | | | | | 70 |
| Modified ethylene resin-14 | | | | | | | | |
| Modified ethylene resin-15 | | | | | | | | |
| Component (B) (wt %) | | | | | | | | |
| SMS | 2 | 0.7 | 2 | 2 | 0.7 | 2 | 2 | 2 |
| PEO-SMS | | 1 | | | 1 | | | |
| DGMS | | 0.3 | | | 0.3 | | | |
| Component (C) (wt %) | | | | | | | | |
| LDPE | 28 | 28 | 28 | 28 | 28 | 70 | 28 | 28 |
| EVA | | | | | | | | |
| Antifogging properties | | | | | | | | |
| Initial antifogging property | ○ | ○ | ○ | ○ | ○ | ○ | ○ | ○ |
| Permanence of antifogging property (days) | 48 | 45 | 47 | >50 | >50 | 44 | 46 | >50 |
| Transparency | | | | | | | | |
| Haze (%) | 12.0 | —* | 11.7 | 12.8 | —* | 12.3 | 11.9 | 12.5 |

| | Ex. II-24 | Ex. II-25 | Ex. II-26 | Comp. Ex. II-1 | Comp. Ex. II-2 | Comp. Ex. II-3 | Comp. Ex. II-4 |
|---|---|---|---|---|---|---|---|
| Component (A) (wt %) | | | | | | | |
| Modified ethylene resin-9 | | | | | | | |
| Modified ethylene resin-10 | | | | | | | |

TABLE 4-continued

| | | | | | | | |
|---|---|---|---|---|---|---|---|
| Modified ethylene resin-11 | | | | | | | |
| Modified ethylene resin-12 | | | | | | | |
| Modified ethylene resin-13 | | | | | | | |
| Modified ethylene resin-14 | 70 | 70 | | | | | |
| Modified ethylene resin-15 | | | 70 | | | | |
| Component (B) (wt %) | | | | | | | |
| SMS | 2 | 0.7 | 2 | 2 | 0.7 | 2 | 0.7 |
| PEO-SMS | | 1 | | | 1 | | |
| DGMS | | 0.3 | | | 0.3 | | 1 |
| Component (C) (wt %) | | | | | | | |
| LDPE | | | | 98 | 98 | | |
| EVA | 28 | 28 | 28 | | | 98 | 98 |
| Antifogging properties | | | | | | | |
| Initial antifogging property | ○ | ○ | ○ | ○ | ○ | ○ | ○ |
| Permanence of antifogging property (days) | 42 | 39 | 40 | 35 | 32 | 32 | 28 |
| Transparency | | | | | | | |
| Haze (%) | 10.0 | —* | 9.6 | 11.8 | —* | 9.7 | —* |

*Not measured

TABLE 5

| | Ex. II-27 | Ex. II-28 | Ex. II-29 | Ex. II-30 | Ex. II-31 | Ex. II-32 | Ex. II-33 | Comp. Ex. II-5 | Comp. Ex. II-6 |
|---|---|---|---|---|---|---|---|---|---|
| Component (A) (wt %) | | | | | | | | | |
| Modified ethylene resin-16 | 70 | | | | | | | | |
| Modified ethylene resin-17 | | 70 | 70 | | | | | | |
| Modified ethylene resin-18 | | | | 70 | | | | | |
| Modified ethylene resin-19 | | | | | 70 | | | | |
| Modified ethylene resin-20 | | | | | | 70 | | | |
| Modified ethylene resin-21 | | | | | | | 70 | | |
| Component (B) (wt %) | | | | | | | | | |
| SMS | 2 | 2 | | 2 | 2 | 2 | 2 | 2 | |
| DGMS | | | 2 | | | | | | 2 |
| Component (C) (wt %) | | | | | | | | | |
| LDPE | 28 | 28 | 28 | 28 | 28 | 28 | 28 | 98 | 98 |
| Antifogging properties | | | | | | | | | |
| Initial antifogging property | ○ | ○ | ○ | ○ | ○ | ○ | ○ | ○ | ○ |
| Permanence of antifogging property (days) | 80 | 90 | 80 | 95 | 95 | 85 | 85 | 60 | 50 |
| Appearance of molded product | ○ | ○ | ○ | ○ | ○ | ○ | ○ | ◎ | ◎ |

What is claimed is:

1. A modified ethylene resin produced by grafting (a) an ethylene resin with (b) an α,β-unsaturated carboxylic acid ester of a hydrocarbon-terminated polyalkylene oxide chain, and with (c) an aromatic vinyl compound and/or (d) an ester of an α,β-unsaturated carboxylic acid with an aliphatic alcohol in the presence of a radical initiator.

2. The modified ethylene resin of claim 1, wherein the grafting is carried out by melt-kneading the components (a), (b), and (c) and/or (d) together in the presence of a radical initiator.

3. The modified ethylene resin of claim 2, wherein the components (b), (c), and (d) and the radical initiator are used in the respective amounts of 0.1 to 50 parts by weight, 0.01 to 50 parts by weight, 0.1 to 50 parts by weight, and 0.01 to 10 parts by weight each based on 100 parts by weight of the component (a).

4. An ethylene resin composition comprising: (A) 80 to 99.9% by weight of a modified ethylene resin produced by grafting (a) an ethylene resin at least with (e) an α,β-unsaturated carboxylic acid ester of a polyalkylene oxide chain; and (B) 20 to 0.1% by weight of a surfactant.

5. The ethylene resin composition of claim 4, wherein the modified ethylene resin has been produced by grafting the ethylene resin with, in addition to the component (e), (c) an aromatic vinyl compound, and/or (d) an ester of an α,β-unsaturated carboxylic acid with an aliphatic alcohol.

6. The ethylene resin composition according to claim 4 or 5, wherein the component (e) is an α,β-unsaturated carboxylic acid ester of a hydrocarbon-terminated polyalkylene oxide chain.

7. The modified ethylene resin of claim 1, wherein said component (a) is polyethylene.

8. The modified ethylene resin of claim 1, wherein said component (a) is a copolymer of ethylene and an α-olefin.

9. The modified ethylene resin of claim 1, wherein said component (a) is a copolymer of ethylene and vinyl acetate.

10. The modified ethylene resin of claim 1, wherein said component (a) is a copolymer of ethylene and an acrylate or methacrylate acid or ester.

11. The modified ethylene resin of claim 1, wherein said component (b) is a methyl terminated polyethylene oxide monomethacrylate.

12. The modified ethylene resin of claim 1, wherein said component (c) is styrene.

13. The modified ethylene resin of claim 1, wherein said component (d) is a methacrylate ester of an aliphatic alcohol.

14. The modified ethylene resin of claim 1, wherein said component (d) is at least one monomer selected from the group consisting of n-butyl methacrylate, cyclohexyl methacrylate, lauryl methacrylate, cetyl methacrylate, and stearyl methacrylate.

15. The modified ethylene resin of claim 2, wherein said radical initiator is a peroxide.

16. The ethylene resin composition of claim 4, wherein said surfactant is a nonionic surfactant.

17. The ethylene resin composition of claim 4, wherein said surfactant is a cationic surfactant.

18. The ethylene resin composition of claim 4, wherein said surfactant is an anionic surfactant.

19. The ethylene resin composition of claim 4, wherein said surfactant is an amphoteric surfactant.

* * * * *